Dec. 13, 1932.  L. W. STONEQUIST ET AL  1,890,657
ADVERTISING DEVICE
Filed July 13, 1928  10 Sheets-Sheet 1

Fig.1

Inventors:
Lawrence W. Stonequist
Charles Rottum
By Parker & Carter Attys.

Dec. 13, 1932.  L. W. STONEQUIST ET AL  1,890,657
ADVERTISING DEVICE
Filed July 13, 1928   10 Sheets-Sheet 2

Inventors
Lawrence W. Stonequist
Charles Rottum
By Parker + Carter Attys

Dec. 13, 1932.  L. W. STONEQUIST ET AL  1,890,657
ADVERTISING DEVICE
Filed July 13, 1928    10 Sheets-Sheet 4

Inventors:
Laurence W. Stonequist
Charles Rottum
By Parker & Carter Attys.

Dec. 13, 1932.   L. W. STONEQUIST ET AL   1,890,657
ADVERTISING DEVICE
Filed July 13, 1928   10 Sheets-Sheet 6

Inventors:
Lawrence W. Stonequist
Charles Rottum
By Parker + Carter Attys

Dec. 13, 1932.      L. W. STONEQUIST ET AL      1,890,657
ADVERTISING DEVICE
Filed July 13, 1928      10 Sheets-Sheet 7

Inventors
Lawrence W. Stonequist
Charles Rottum
By Parker + Carter Attys.

Patented Dec. 13, 1932

1,890,657

UNITED STATES PATENT OFFICE

LAWRENCE W. STONEQUIST AND CHARLES ROTTUM, OF CHICAGO, ILLINOIS

ADVERTISING DEVICE

Application filed July 13, 1928. Serial No. 292,434.

This invention relates to advertising devices and has for its object to provide a new and improved device of this description.

The invention has as a further object to provide an illuminated advertising device.

The invention has as a further object to provide an advertising device that will give the effect of moving pictures.

The invention has other objects which are more particularly set out in the accompanying description.

Referring now to the drawings.

Like numerals refer to like parts throughout the several figures.

Referring now to the drawings, we have shown a frame or casing 1 arranged to support the mechanism. A screen 2 is mounted on rollers 3 and 4 carried by shafts 5 and 6 mounted in said frame. The rollers are rotatably mounted in position and the screen is moved intermittently in front of a light receptacle 7 provided with a series of compartments containing lights with means for successively lighting these lights while the screen is stationary so as to produce the effect of moving pictures as will be hereinafter more fully explained.

The screen may have upon its rear face pictures or lettering or reading material or any other suitable characters which are normally concealed from view and which are brought into view by lighting the lights in the compartments back of such characters. The characters may be on the front of the screen if desired. The screen 2 is arranged so that it may be intermittently moved across the face of the light receptacle 7 to bring different characters thereon in front of the lights, the screen being stopped when these new characters are in position and the lights successively lighted so as to bring them into view. Means are also provided for reversing the screen to bring it back to its initial position and again starting it forward. These actions are all preferably automatic so that the device when started will act continuously.

Figure 1:
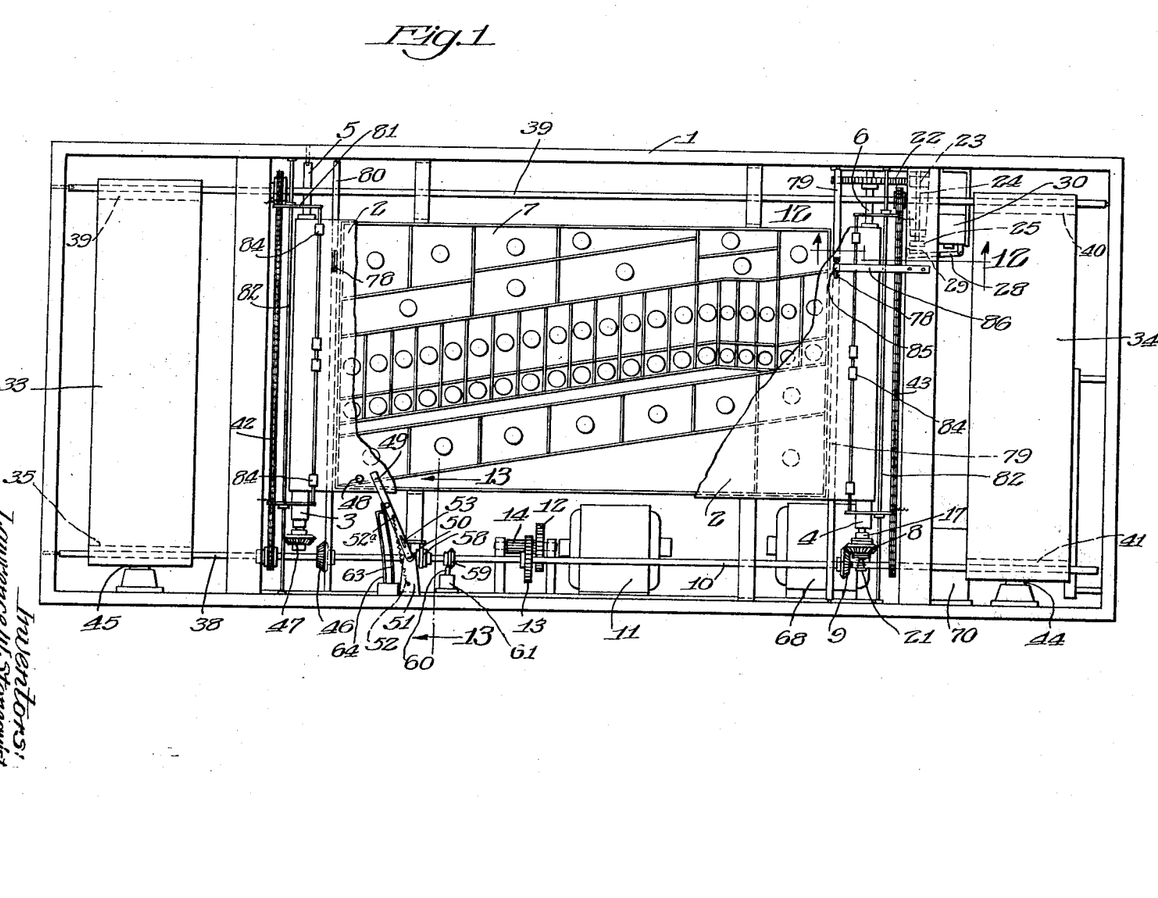
Fig. 1 is a front view of one form of device embodying the invention with the front omitted and with parts broken away.

In the drawings one form of apparatus for performing these functions is illustrated. The shaft of the roller 4 is provided with a beveled gear 8 adapted to engage a beveled gear 9 on a shaft 10. When these two gears are meshing and the shaft 10 rotating, the screen 2 is moved toward the right, (Fig. 1).

Figure 11:
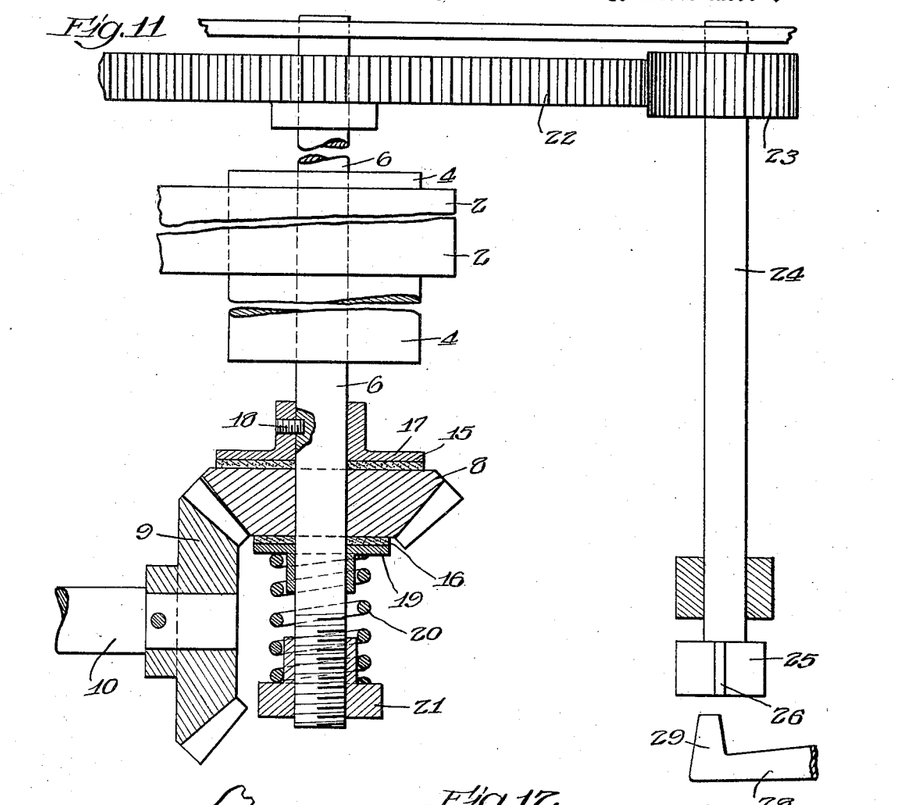
Fig. 11 is an enlarged sectional view taken on line 11—11 of Fig. 3 with parts omitted.

The shaft 10 is operated by the motor 11 through certain reducing gears, including the gears 12 and 13 and the elongated gear 14. The beveled gear 8 is connected with the shaft 6 of the roller 4 so that the shaft 6 may be stopped while the gear 8 is still rotating. In the construction shown, this result is secured by a friction clutch. One form of clutch is illustrated in Fig. 11 wherein the beveled gear 8 is shown as being loose upon the shaft 6 and being provided on opposite sides with the friction plates 15 and 16. The plate 15 is connected with a disc 17 attached to the shaft 6 so as to rotate therewith as by means of the screw 18. The plate 16 is connected with the disc 19 slidably mounted upon the shaft 6. The disc 19 is pressed toward the beveled gear 8 by the spring 20 which at the other end engages the adjustable member 21.

The member 21 is made adjustable by being threaded on to the end of the shaft 6 so that the pressure of the spring 20 may be regulated. It will be seen that by this construction the shaft 6 and roller 4 may be stopped while the gears 8 and 9 and the shaft 10 are rotating.

Figure 12:
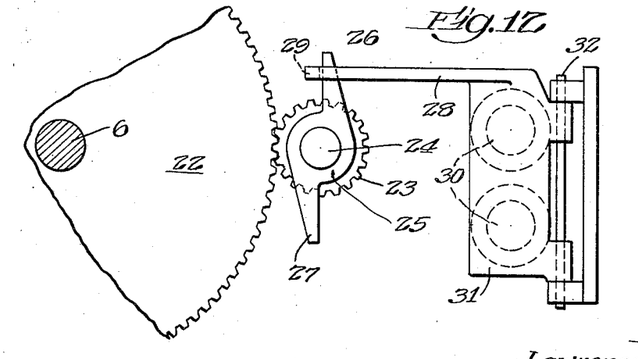
Fig. 12 is a view taken on line 12—12 of Fig. 1 with parts omitted.

In the construction shown some means is provided for stopping the movement of the screen 2 after it has been moved a predetermined amount to bring a new set of characters in front of the light receptacle. As illustrated in the drawings this result is secured by stopping the roller 4 and the shaft 6 at predetermined intervals. For this purpose the shaft 6 is provided with a gear 22 which engages a gear 23 on a shaft 24 (see Figs. 1, 11 and 12). The shaft 24 has connected therewith a locking member 25 provided with the arms 26 and 27. A locking arm 28, provided with a locking projection 29 is arranged so as to be moved up to engage the locking member 29 so as to stop the rotation of the shafts 24 and 6 and the roller 4. This locking arm is automatically controlled so as to stop the roller 4 at predetermined intervals, without stopping the motor 11. The locking arm 28 may be moved by any suitable mechanism. As herein shown, it is moved by means of an electromagnetic device consisting of the magnets 30 operated on the armature 31 which is pivoted by the pivot 32, the locking arm being connected with said armature, as clearly shown in Figs. 12 and 16. The shaft 10 operated by the motor 11 drives the belts 33 and 34 which have suitable advertising matter thereon. The belt 33 runs over rollers 35 and 36 on the shafts 38, 39. The belt 34 runs over rollers 40 and 41 on said shafts 38 and 39. The shaft 39 is driven from the shaft 10 by the belt 42 and the shaft 38 is driven from the shaft 39 by the belt 43 (see Fig. 16).

Figure 2:
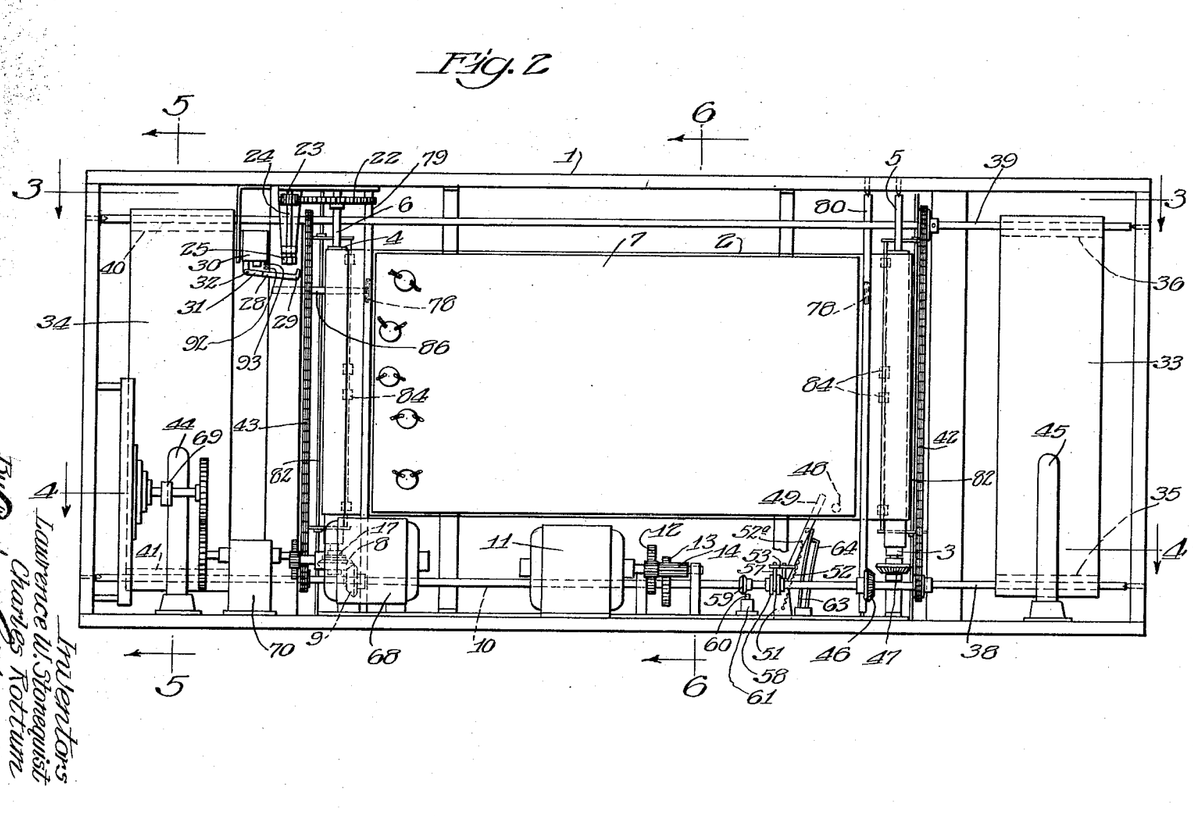
Fig. 2 is a rear view of the device illustrated in Fig. 1 with the back removed to expose the mechanism.

A light 44 is located back of the belt 34 and a similar light 45 is located back of the belt 33 (see Fig. 2). These belts, therefore, may be operated when the screen is stopped by the locking arm 28. Some means is provided for rewinding the screen after it has been all passed in front of the light receptacle. As herein shown, the shaft 10 is movable longitudinally and is provided with a beveled gear 46 normally out of engagement with the beveled gear 47 on the shaft 5 of the roller 3. When the screen has been moved until all the part thereof having advertising matter on it has passed in front of the light receptacle 7, a projection 48 on the screen engages an arm 49 (see Figs. 1, 13 and 14) pivoted at 50 to a fixed part 51. In the particular construction shown, the arm 49 is provided with a slot through which the screen passes. The arm 49 is moved by the projection 48 and acts to move the shaft 10 longitudinally to disconnect the gears 8 and 9 and connect the gears 46 and 47. This reverses the screen and it runs back continuously until the desired amount of the screen is rewound on the roller 3 whereupon a similar projection on the screen engages the arm 49 and moves it back to the position shown in Figs. 1 and 14, thus disconnecting the gears 46 and 47 and connecting the gears 8 and 9.

Figure 13:
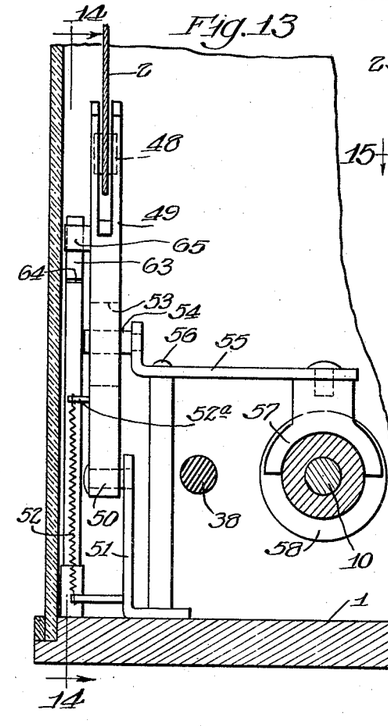
Fig. 13 is a sectional view taken on line 13—13 of Fig. 1.
Figure 14:
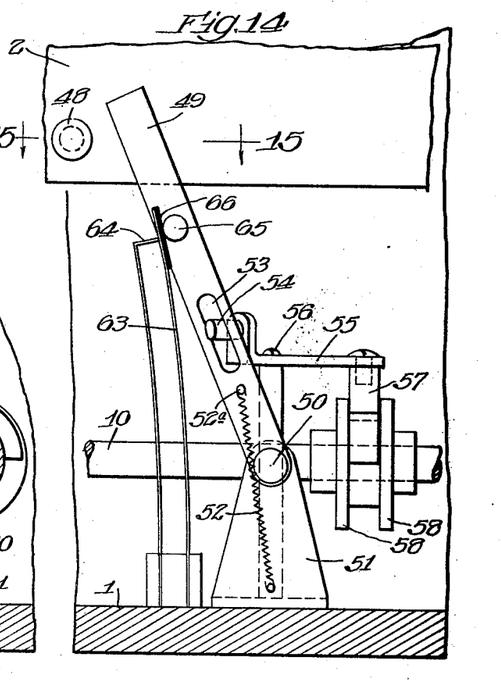
Fig. 14 is a sectional view taken on line 14—14 of Fig. 13.
Figure 15:
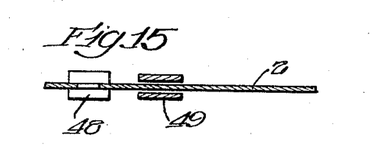
Fig. 15 is a sectional view taken on line 15—15 of Fig. 14.

When the lever 49 is moved to the right, (Figs. 1 and 14), by the projection 48, the mechanism by which the arm 49 moves the shaft 10 is shown in detail in Figs. 13 and 14.

The arm 49 is provided with a spring 52, one end of which is connected to the fixed part 51. The arm 49 is provided with a slot 53 into which projects a pin 54 connected with an arm 55 pivoted at 56. Connected with the arm 55 is a fork 57 located between the flanges 58 on the shaft 10.

Figure 4:
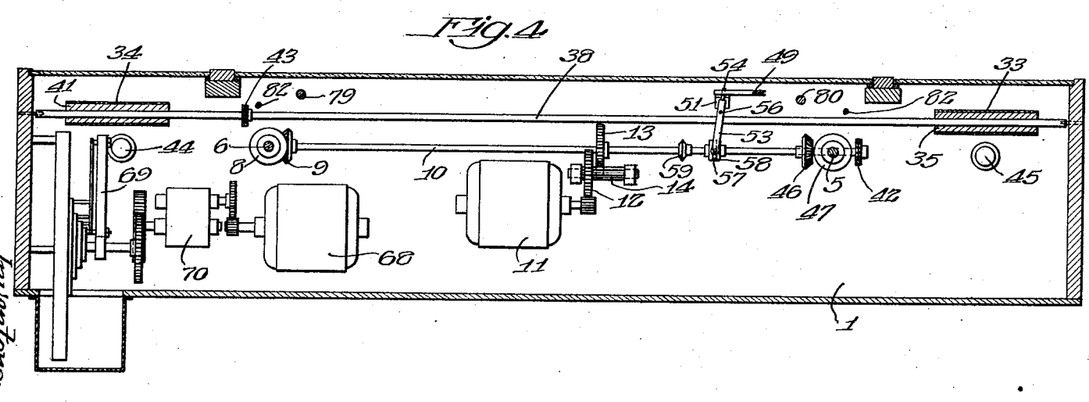
Fig. 4 is a sectional view taken on line 4—4 of Fig. 2.
Figure 5:
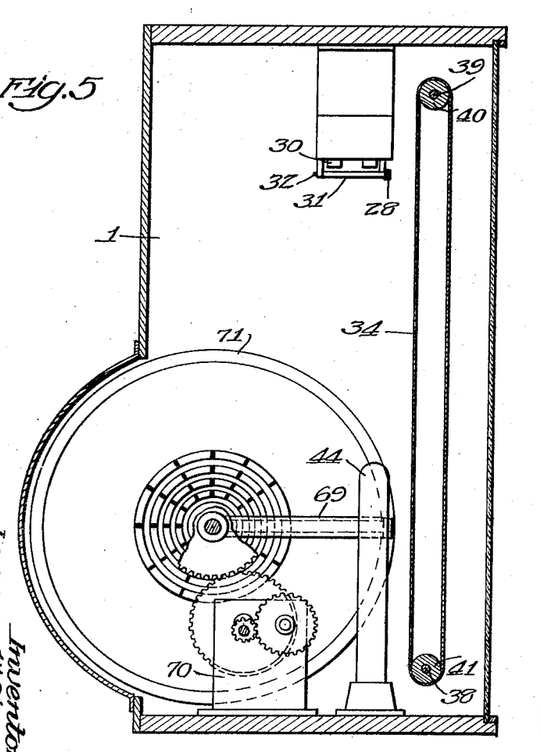
Fig. 5 is a sectional view taken on line 5—5 of Fig. 2.
Figure 6:
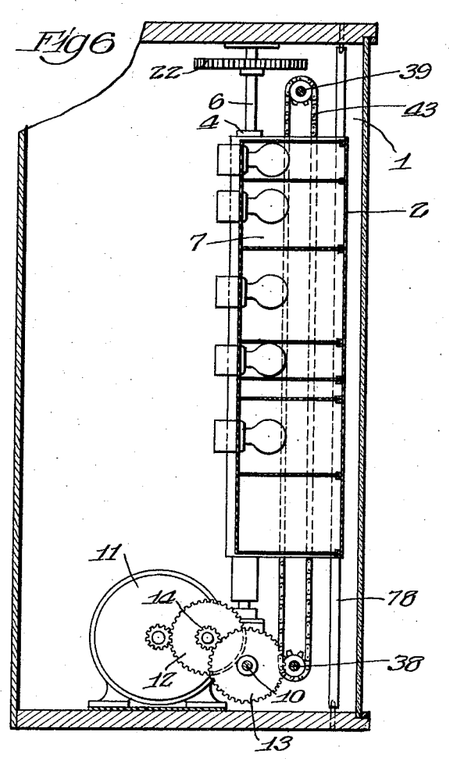
Fig. 6 is a sectional view taken on line 6—6 of Fig. 2.
Figure 7:
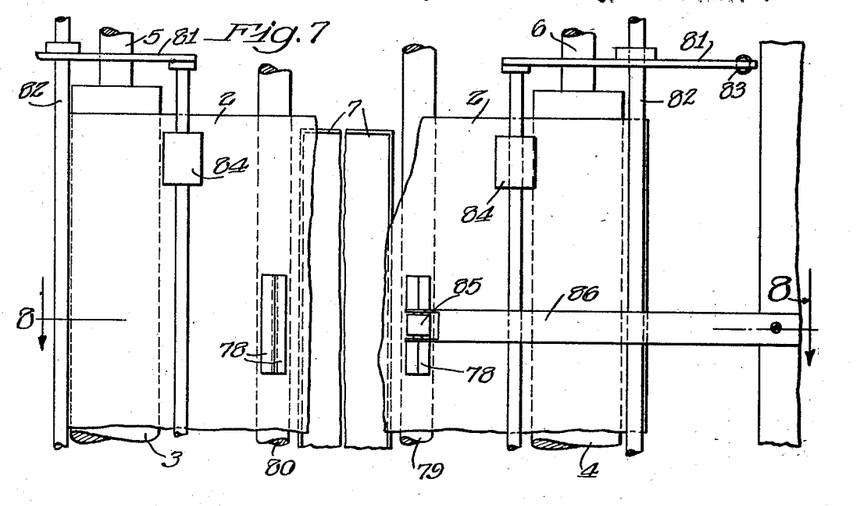
Fig. 7 is an enlarged view showing the electrical contacts on the moving screen.
Figure 18:
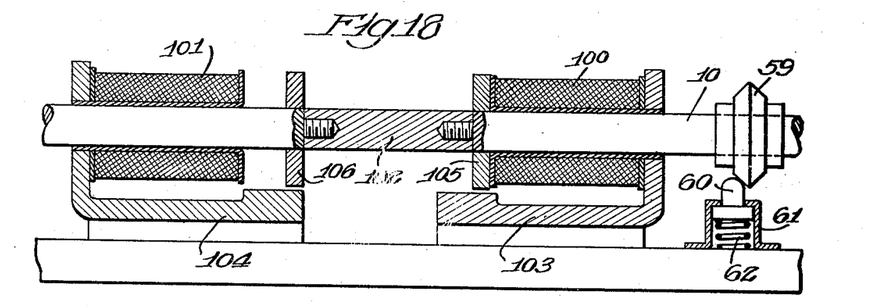
Fig. 18 is a sectional view through the reversing solenoids for the screen shown in Fig. 17.

The fork 57 is stationary and does not interfere with the rotation of the shaft. When the arm 49 is moved in one direction by the projection 48, the arm 55 is moved about its pivot so as to move the fork 57 and this fork engaging one of the flanges 58 moves the shaft 10 longitudinally. The projection 48 is only required to move the arm 49 a sufficient amount to move the point 52a where the spring is connected to said lever, past the pivot 50 whereupon the spring acts to produce the further desired movement of the lever. The shaft 10 is provided with a beveled engaging part 59 which engages a spring actuated stop 60. This stop works in a casing 61. This stop is pressed outwardly by the spring 62, (see Fig. 18). As the shaft is moved, the engaging part 59 passes on one side of the stop to the other, the stop being pressed into the casing and then being pressed outwardly again by the spring. When the arm 49 (see Figs. 1 and 14), is moved to the left to the position shown in Fig. 4, it presses into engagement the electrical contacts 63 and 64 by means of a projection 65 which engages one of the contacts. An insulating piece 66 is located on the contact 63 so that the pin engages it thereby preventing any current from passing from the contact to the arm. These contacts control the circuit through the magnets 30. When the arm 49 is in the position shown in Fig. 14, the contacts are together so as to complete the circuit and when the arm 49 is moved to the right, the contact 63, which is a spring contact, moves away from the contact 64 and breaks the circuit. The circuits of the electric lights and the other electrical circuits are controlled by a motor 68. The motor 68 operates a commutator or circuit controlling arm 69.

Figure 3:
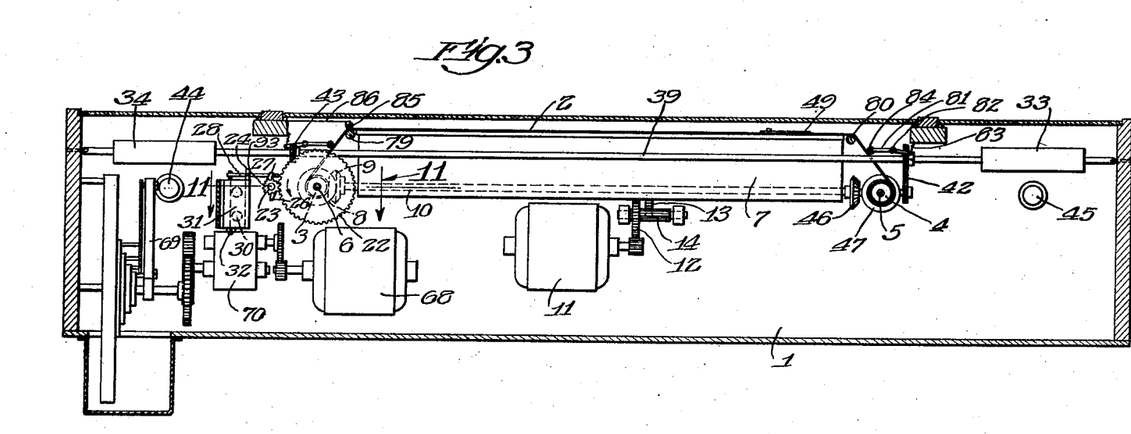
Fig. 3 is a sectional view taken on line 3—3 of Fig. 2.

The arm 69 is connected with the motor 68 by a speed reducing mechanism as shown at 70, (see Figs. 3 and 4), so that the arm is moved at the desired slow speed. This arm is moved about a commutator provided with a series of contacts arranged so as to make and break the circuits desired. These contacts and circuits are shown diagrammatically in Fig. 16. The commutator is provided with a main contact 71 which is in contact with the contact arm 69 during most of its movement. Interposed between the ends of this main contact, and insulated therefrom, is an auxiliary contact 72. This contact is connected to a conductor 73 which leads to the screen motor 11.

A conductor 74 connects the screen motor with one of the main line conductors 75. The other main line conductor 76 is connected with a continuous ring contact 77 on the commutator which is continuously engaged by the arm 69. The screen 2 is provided with a series of contacts 78 (see Figs. 8, 9, 10 and 16), arranged therealong and so spaced apart that one of these contacts engages the screen guide 79 after the screen has been moved a sufficient distance and when it is desired to stop such screen. The contacts 78 may be formed in any desired manner. As shown in Figs. 9 and 10, each contact consists of two metallic pieces each bent back upon itself. The screen is slit and these pieces inserted in position as shown in Figs. 9 and 10. This gives a sufficient length of contact and at the same time permits the free bending of the contact around the screen guide 79.

There is a similar screen guide 80 on the opposite side of the light receptacle 7. These screen guides are so positioned as to maintain the screen in proper position with the edge of the light receptacle as shown in Fig. 8 so that the screen will pass along the edges of the various compartments and will be so close to such edges as to prevent the light from leaking past them thus getting the full benefit of the lights in the compartments and limiting the effect of those lights to the compartments in which they are contained.

Figure 8:
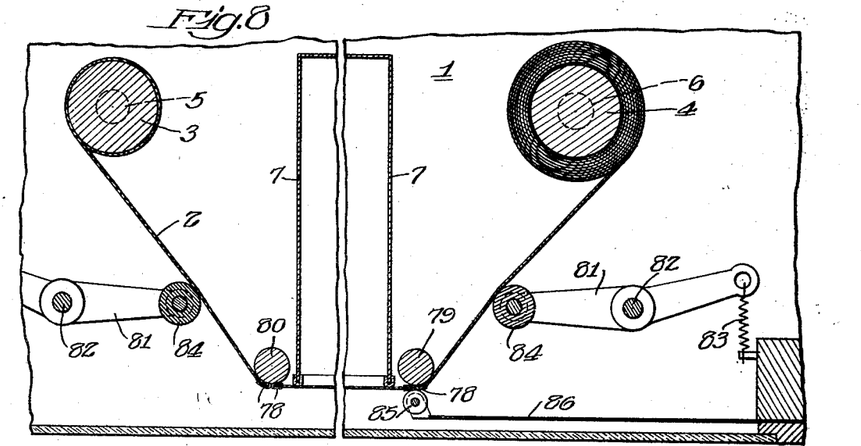
Fig. 8 is a sectional view taken on line 8—8 of Fig. 7.
Figures 9, 10:
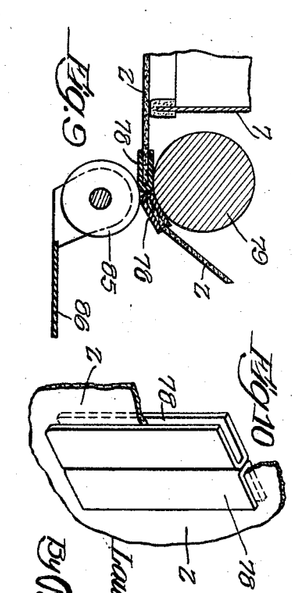
Fig. 9 is an enlarged view showing one of the electrical contacts passing around the guide roller.
Fig. 10 is a perspective view of the contact shown in Fig. 9.

Screen tightening members 81 engage the screen on opposite sides of the light compartment and near the screen guides as shown in Fig. 8. These tightening members are pivoted at 82 and their ends are pressed against the screen by springs 83. The ends of these tightening devices are preferably provided with screen engaging rollers 84. A contact 85 is arranged to engage the screen contact 78 when such screen contact engages the screen guide 79 (see Figs. 8 and 16). This contact is connected with an arm 86 which in turn is connected by a conductor 87 with the electromagnets 30, said electromagnets being connected by a conductor 88 with the contact 63. The contact 64 is connected by a conductor 89 with the conductor 74 connected with the main line conductor 75. The screen guide 79 is connected by a conductor 90 with a contact 91 on the commutator.

When the contact 78 is in contact with the screen guide 79 and the contact 85, the arm 69 engages the contact 91 and the circuit is therefore completed through the arm 69 to the ring 77 and thence to the main line conductor 76. The electromagnets 30 are then energized and the armature 31 is moved carrying with it the arm 28 which engages the locking member 25 to lock the screen against further movement with the contact 78 in its contacting position in the circuit just described. The movement of the arm 28 moves the contact 92 into engagement with the contact 93. This completes the circuit through the commutator motor 68, the circuit being as follows:—

From conductor 75 through conductor 94 thence through commutator motor 68, then by a conductor 95 to contact 93, then to contact 92, then by a conductor 96 to contact 97 on the commutator, and thence through arm 69 which then engages this contact to ring 77 and thence to the main line conductor 76.

When the commutator arm is in this position, the circuit through the screen motor is completed, the circuit being traced as follows:

From main line conductor 75 through conductor 74 to the screen motor 11, thence by the conductor 98 to contact 72 on the commutator, thence through arm 69 which then engages this contact to ring 77 and thence to main line conductor 76. When contacts 92 and 93 are brought together to complete the circuit through the commutator motor 68, this motor starts up and moves the commutator arm 69 off of contacts 72, 97 and 91. This breaks the circuit through the screen motor 11 and stops it. It also breaks the circuit through the magnets 30 and they are de-energized and release the arm 28 so that it drops and releases the locking member 25. The screen is now stationary as the screen motor is not operating.

Before the circuit through the commutator motor is broken by the de-energizing of the magnets, the contact arm 69 engages the contact 71 and completes another circuit through the commutator motor 68, this circuit being as follows:

From the main line conductor 75 through conductor 94 then through the commutator motor 68, then by conductor 99 to contact 71, thence through arm 69 to ring 77 and thence to main line conductor 76. The contact arm 69 then continues to move and moves over contacts 100ª, 101ª, 102ª, 103ª, 104ª, 105ª and so forth successively lighting the lights in the different compartments of the light receptacle. It will be noted that the contact arm 69 is wide so that it will pass over the insulation between the contacts 72 and 71, engaging one contact before it leaves the other. The contact 72 is somewhat longer at the right than the contacts 91 and 97, so that the contact arm 69 does not engage them until it disengages contact 71. It is found that the inertia of the parts insures the moving of the contact arm 69 so that it contacts with contacts 91 and 97 before the motor is stopped.

These lights are arranged to be successively lighted and to thus successively light portions of the screen from the left to the right and light up the characters on the screen so as to make the appearance of moving pictures or moving characters along such screen.

When all the lights have been lighted, the contact arm 69 moves from contact 71 to contacts 72 and 91 and 97. This stops the contact motor 68 and starts the screen motor 11. Since the screen has been unlocked, it will now move up the proper distance until another contact 78 engages the screen guide 79 whereupon the operation hereinbefore described is repeated. When the entire screen has been moved across the screen receptacle, the projection 48 on the screen engages the arm 49 and moves it so as to move the shaft 10 to disconnect said shaft from the roller 4 and connect it with the roller 3.

Figure 16:
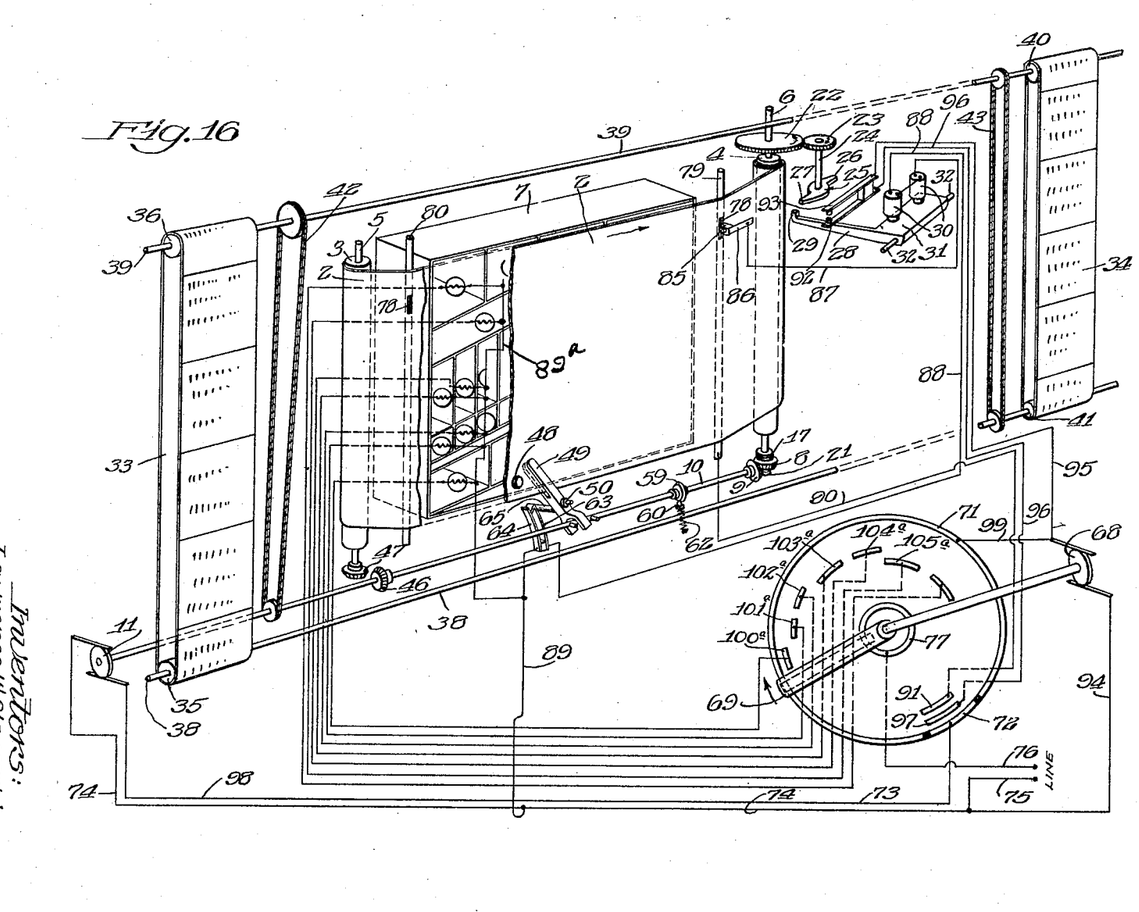
Fig. 16 is a diagrammatic view of the devices shown in Fig. 1.

The screen motor being now in operation rewinds the screen on to the roller 3 and when the entire screen has been rewound, a projection on the screen engages the arm 49 and moves it back to the position shown in Figs. 14 and 16 and the operation hereinbefore described is repeated.

It will be seen that the device when in operation will run continuously twenty-four hours a day without attention and without the intervention of the operator.

When the screen motor is in operation, the belts 33 and 34 are operated and the lights back of them are lighted so as to show the advertising matter thereon. We have shown these belts as endless belts but it is, of course evident that they may be belts wound on rollers just like the screen 2 and operated simultaneously with said screen by a similar mechanism.

It will further be seen that the screen 2 may be of any desired length and that a large number of changes may be made by an apparatus which occupies a comparatively small space. It will also be seen that this device when once set in motion takes care of itself and will operate efficiently and satisfactorily under all conditions.

Figure 17:
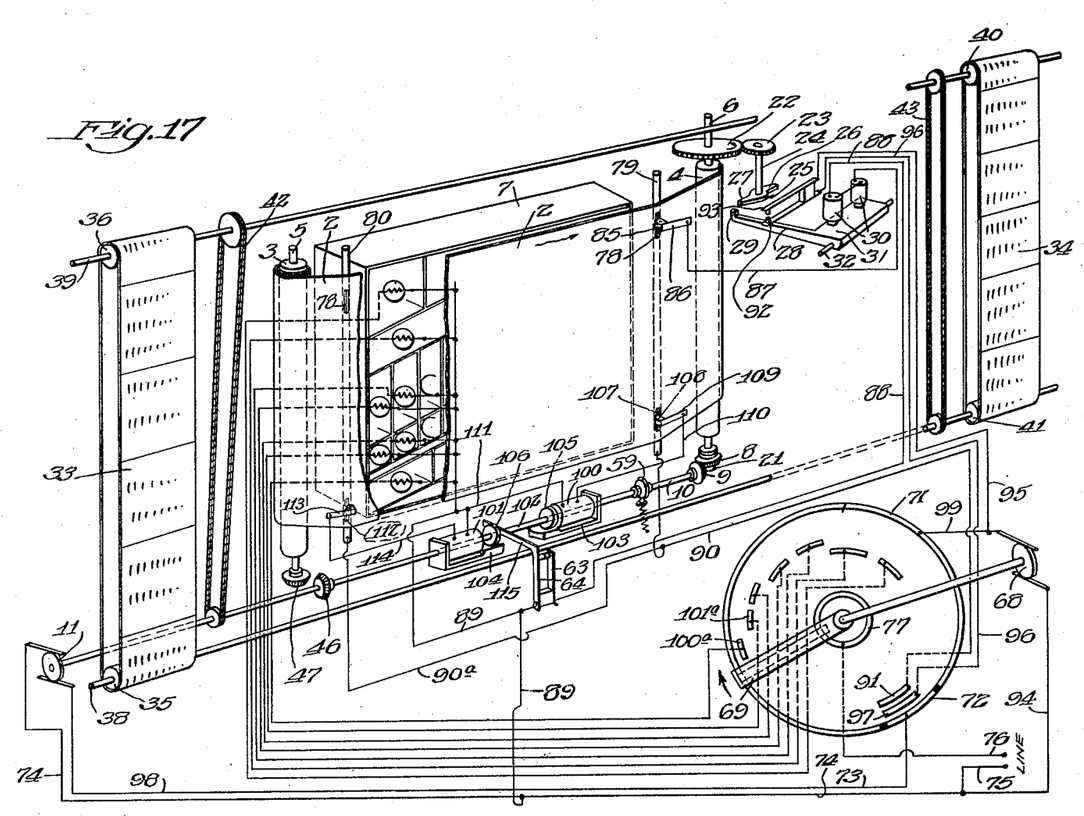
Fig. 17 is a diagrammatic view similar to Fig. 16 showing a modified construction.

The device may be used as a daylight device by placing the pictures, advertisements, reading matter or other characters upon the exposed face of the screen. Instead of having the shifting mechanism for the shaft 10 mechanical, as shown in Fig. 1, it may be made electrical as shown in Fig. 17. In this construction the shaft 10 is shifted by means of the electro-magnetic devices 100 and 101. These devices are shown as coils around the shaft 10 as clearly shown in Figs. 17 and 18. A portion of the shaft 102 between them is made of non-magnetic material such as brass. Associated with the coils 100 and 101 are the pole pieces 103 and 104 which are fastened to a suitable fixed support as shown. The shaft 10 has fastened thereto the pole pieces 105 and 106. The coil 101 is energized by contacts 107 on the screen 2 located so as to engage the screen guide 79 at the same time it is engaged by the contact 78. The contact 107 is engaged by a contact 108 connected with the arm 109 which arm is connected by a conductor 110 with the coil 100.

A conductor 111 connects this coil with the conductor 89 leading through the conductor 74 to the main line conductor 75. The coil 101 is only energized when it is desired to rewind the screen and is energized through a contact 112 which engages the screen guide 80 after the screen has been entirely unwound at which time the contact 112 engages the arm 113 which is connected by a conductor 114 with the coil 101, the current then passing through the coil and passing by conductor 89 back to the main line conductor 75.

The armature piece 106 engages an arm 115 which extends from the contact 64 and brings them into contact with the contact 63 when the coil 100 is energized and the parts are in the position shown in Fig. 17, thus completing the circuit therethrough.

The arm 115 is moved away from the contact 64 when the coil 101 is energized and as the contacts are spring contacts, they are spread apart and the circuit is then broken as hereinbefore described. The screen guide 80 is connected in the circuit by connecting the conductor 90 therewith through the agency of the conductor 90a. The remaining circuits are the same as shown in Fig. 16.

Figure 19:
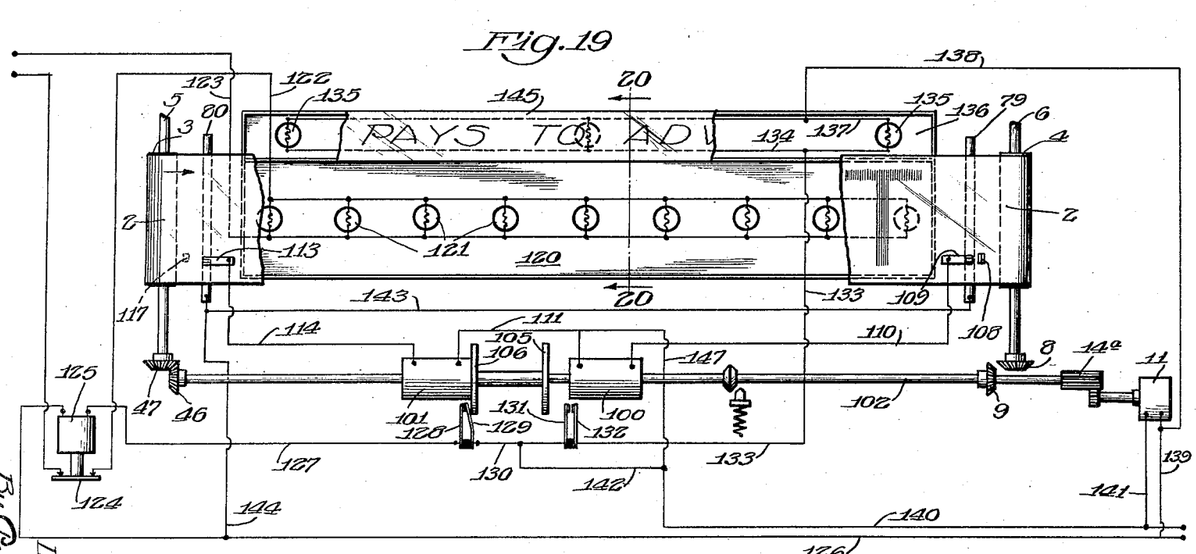
Fig. 19 is a view showing a modified construction.
Figure 20:
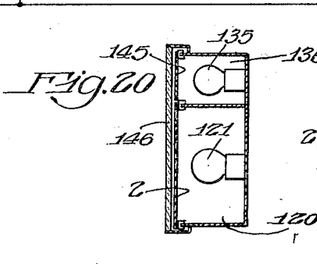
Fig. 20 is a sectional view taken on line 20—20 of Fig. 19.
Figure 21:
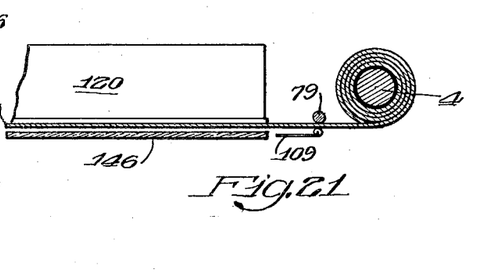
Fig. 21 is a sectional view through a portion of the screen and the translucent member in front of it.

In Figs. 19 to 21 a modified construction is shown particularly adapted to be used in signs having reading matter. In this construction, the screen 2 is mounted upon the rollers 3 and 4 on shafts 5 and 6, the rollers being operated by the shaft 102 and the electromagnets 100 and 101 in the manner shown in Fig. 17. A single motor is used which consists of the screen motor 11 connected to the shaft 102 by the elongated gear 14a. The screen 2 passes in front of a light receptacle 120 containing a series of lights 121 connected by conductors 122 and 123 with a source of electric supply. This light receptacle may be as long as desired and when a number of lights are used it is preferable to provide a switch 124 for opening and closing the circuit, said switch being operated by the electromagnet 125. When the electromagnet is used, it is connected to one branch of the main line 126.

A conductor 127 leads from this magnet to a contact 128 which is opposed to a contact 129, the latter contact being preferably a spring contact and being normally opened except when closed by the armature 106 of the electromagnet 101. The contact 129 is connected by a conductor 130 with the contact 131 which is preferably a spring contact and is opposed to the contact 132 and normally disconnected therefrom except when pressed thereagainst by the armature 105 of the electromagnet 100. The contact 132 is connected by a conductor 133 with the conductor 134 which forms one terminal of the lights 135 in a second light receptacle 136. The other terminal 137 of these lights is connected by a conductor 138 to the conductor 139 connected with the main line 126. This conductor is also connected with the motor 11 which is connected to the other main line 140 by the conductor 141. The conductor 130 is connected by a conductor 142 which the main line 140. The screen guides 79 and 80 are connected together by the conductor 143 and the conductor 143 is connected by a conductor 144 with the main line 126.

The light receptacle 136 is preferably provided with an advertising member 145 which may be a stationary advertisement. A translucent member 146 may be placed in front of the member 145 and the screen 2 so that when the lights are not in operation, the advertising matter will not show. These translucent members may be omitted if desired. When the parts are in the position illustrated in Fig. 19, the electromagnet 101 is energized, the circuit through the magnet being as follows:

From main conductor 126 through conductors 144 and 143 to screen guide 80, contacts 117 and 113, thence through the conductor 114, to electromagnet 101, thence by conductors 111 and 147 to the main line 140.

The screen 2 is now being unwound, the lights 121 are in operation and the advertising matter is passed in front of these lights so that the separate parts thereof come successively into view. If this advertising matter consists of reading matter, the letters will come into view one at a time and can be read after they come into view. The light receptacle may be as long as desired so that as much reading matter as desired will be exposed to view. When the screen passes the other end of the light receptacle, the matter thereon disappears from view.

After the screen has been unwound, the contact 108 on the screen engages the contact 109 and the screen guide 79 connecting them together and in circuit, the circuit being traced as follows:

From main conductor 126 through conductor 144 to conductor 143, thence through screen guide 79, contact 108, contact 109 and conductor 110 to the electromagnet 100, thence by conductor 147 to conductor 140.

This energizes the electromagnet 100 and causes the shaft 102 to be moved to the right so as to disconnect gears 46 and 47 and connect gears 8 and 9. The armature 106 moves with the shaft and is moved away so that contacts 101 and 129 are disconnected. This breaks the circuit through the electromagnet 125 and the circuit through the lights 121 is broken and they go out. The armature 105 of electromagnet 100 is moved to the right and engages contact 131 so as to connect it with contact 132. This establishes the circuit through the lights 135. This circuit is traced as follows:

From conductor 126 through conductors 139 and 138 to conductor 137, thence through lights 135 to conductor 134, thence by conductor 133 to contacts 132 and 131, thence by conductors 130 and 142 to main line 140. It will be seen that the advertising matter associated with light receptacle 136 will show while the screen is being retracted and if the translucent device 146 is used, the advertising matter on the screen 2 will not show.

It is, of course, evident that this device may be used with any kind of advertising matter such as pictures, words, or characters of any kind. In Figs. 1, 16 and 17 we have shown the construction for moving pictures where there are a series of compartments each having a light, such lights being controlled by the commutator motor 68. When the moving picture compartments and lights are used, the lights may all be connected with a single return wire 89a which connects with the wire 89. The other terminals are connected to the contacts of the commutator. Any suitable circuit arrangement may be used for this purpose such, for example, as that shown in Patent Number 1,641,609, issued September 6, 1927.

We claim:—

1. An advertising device comprising a moving screen moving lengthwise of the device and a movable screen moving at an angle to said first movable screen, said screens having characters thereon to be displayed, a common driving means therefor, and means for intermittently stopping and starting one of said screens while the other screen is in continuous operation.

2. An advertising device comprising a screen having characters thereon to be displayed, a driving mechanism for said screen, a lighting system for successively lighting different portions of said screen, a separate controlling mechanism for said lighting system and an interconnection between the driving mechanism of the two systems whereby they alternately start and stop each other.

3. An advertising device comprising a screen, a motor for moving said screen, a driving connection between said motor and said screen, and electrically actuated means for stopping said screen while the motor is still in operation and in connection with said screen.

4. An advertising device comprising a screen, a motor for moving said screen, a driving connection between said motor and said screen, means for stopping said screen while the motor is still in operation, a lighting system for lighting said screen, a motor for controlling said lighting system and means actuated by the screen driving motor for starting the motor of the lighting system.

5. An advertising device comprising a screen, a motor for moving said screen, a driving connection between said motor and said screen, means for stopping said screen while the motor is still in operation, a lighting system for lighting said screen, a motor for controlling said lighting system, means actuated by the screen driving motor for starting the motor of the lighting system, and means actuated by the lighting system motor for stopping the screen motor.

6. An advertising device comprising a screen, a motor for moving said screen, a driving connection between said motor and said screen, means for stopping said screen while the motor is still in operation, a lighting system for lighting said screen, a motor for controlling said lighting system, means actuated by the screen driving motor for starting the motor of the lighting system, and means actuated by the lighting system motor for intermittently stopping and starting the screen motor.

7. An advertising device comprising a screen, two separated rollers for said screen, shafts connected with said rollers, gears on said shafts, a motor, a shaft connected with said motor, gears on said motor shaft, means actuated by the moving screen for automatically moving said gears to alternately connect and disconnect the motor shaft with the screen roller shafts, and means for stopping the movement to the screen while the gears on one of said screen roller shafts are in operative connection with the gear on the motor shaft and the motor is connected with said motor shaft.

8. An advertising device comprising a screen, two separated rollers for said screen, shafts connected with said rollers, gears on said shafts, a motor, a shaft connected with said motor, gears on said motor shaft, means actuated by the moving screen for automatically moving said gears to alternately connect and disconnect the motor shaft with the screen roller shafts, and means for stopping the movement of the screen while the gear on one of said screen roller shafts is in operative connection with the gear on the motor shaft and the motor is connected with said motor shaft, said latter means being brought into operation by parts associated with said screen.

9. An advertising device comprising a movable screen having characters thereon to be displayed, means for lighting said characters comprising a plurality of separated lighting compartments, moving mechanism for moving said screen so as to bring different portions thereof successively in front of said compartments, lights in said compartments and means for lighting said lights so as to bring said portions into view so that it will be lighted by said lights.

10. An advertising device comprising a movable screen having characters thereon, means for moving said screen so that different portions thereof will be successively in front of said compartments, lights in said compartments and means for lighting said lights so as to bring said portions into view and means actuated by the moving screen for automatically retracting said screen to its initial position.

Signed at Chicago, county of Cook and State of Illinois this 29th day of June, 1928.

LAWRENCE W. STONEQUIST.
CHARLES ROTTUM.